US007649899B2

(12) United States Patent
Erwin et al.

(10) Patent No.: US 7,649,899 B2
(45) Date of Patent: Jan. 19, 2010

(54) SYSTEM AND METHOD FOR DYNAMIC EGRESS ROUTING THROUGH A SINGLE DEFAULT GATEWAY IN A MESH NETWORK

(75) Inventors: Jeff Baird Erwin, Sammamish, WA (US); Stephen Thomas Kelly, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 623 days.

(21) Appl. No.: 11/000,232

(22) Filed: Nov. 29, 2004

(65) Prior Publication Data

US 2006/0153206 A1 Jul. 13, 2006

(51) Int. Cl.
 *H04L 12/28* (2006.01)
(52) U.S. Cl. ........................ 370/401; 370/238; 370/255; 370/328; 370/338; 370/400
(58) Field of Classification Search ................ 370/238, 370/255, 252, 328, 338, 351, 400, 401, 410
See application file for complete search history.

(56) References Cited

U.S. PATENT DOCUMENTS

| | | | |
|---|---|---|---|
| 6,122,743 A | 9/2000 | Shaffer et al. ................ 726/3 |
| 6,728,232 B2 | 4/2004 | Hasty et al. ................. 370/338 |
| 6,791,949 B1 * | 9/2004 | Ryu et al. ................... 370/254 |
| 6,836,463 B2 | 12/2004 | Garcia-Luna-Aceves et al. .......................... 370/238 |
| 6,842,462 B1 | 1/2005 | Ramjee et al. .............. 370/466 |
| 6,965,575 B2 * | 11/2005 | Srikrishna et al. .......... 370/252 |
| 6,982,966 B2 * | 1/2006 | Eidenschink et al. ....... 370/322 |
| 7,058,021 B2 * | 6/2006 | Srikrishna et al. .......... 370/252 |
| 7,085,241 B1 | 8/2006 | O'Neill et al. .............. 370/254 |
| 7,099,286 B1 | 8/2006 | Swallow ..................... 370/255 |
| 7,111,163 B1 | 9/2006 | Haney ........................ 713/153 |
| 7,251,238 B2 * | 7/2007 | Joshi et al. ................. 370/338 |
| 7,263,070 B1 | 8/2007 | Delker et al. ............... 370/254 |
| 7,280,483 B2 * | 10/2007 | Joshi ......................... 370/238 |
| 7,315,548 B2 * | 1/2008 | Joshi ......................... 370/401 |
| 7,376,087 B2 * | 5/2008 | Srikrishna .................. 370/238 |

(Continued)

OTHER PUBLICATIONS

Office Action mailed Nov. 27, 2007, U.S. Appl. No. 10/996,769, filed Nov. 24, 2004. entitled "System and Method for Using a Hop Limited Cast for Internet Egress Point Selection".

(Continued)

*Primary Examiner*—Pankaj Kumar
*Assistant Examiner*—Mark Mais
(74) *Attorney, Agent, or Firm*—Merchant & Gould; Ryan T. Grace

(57) ABSTRACT

A system and method for dynamic egress routing through a default gateway in a network is disclosed. One aspect of the present invention includes providing a default gateway that manages routes to Internet egress points for a client. The default gateway includes a list of Internet egress points that correspond to the default gateway. A metric is applied to the list to determine the optimal path to an Internet egress point. The default gateway uses the optimal path to manage Internet access routing for the client. Another embodiment includes a system for managing routing to Internet egress points on a network having a default gateway configured to route data packets between the Internet egress points and a client. The default gateway determines the optimal path to the Internet egress points.

18 Claims, 5 Drawing Sheets

U.S. PATENT DOCUMENTS

| | | | |
|---|---|---|---|
| 7,376,122 B2 * | 5/2008 | Draves et al. | 370/351 |
| 7,382,759 B2 * | 6/2008 | Joshi et al. | 370/338 |
| 7,394,826 B2 * | 7/2008 | Cain et al. | 370/469 |
| 7,450,517 B2 * | 11/2008 | Cho | 370/238 |
| 7,489,635 B2 * | 2/2009 | Evans et al. | 370/235 |
| 7,496,680 B2 * | 2/2009 | Canright | 709/238 |
| 2001/0036161 A1 * | 11/2001 | Eidenschink et al. | 370/316 |
| 2003/0137930 A1 | 7/2003 | Futernik | 370/216 |
| 2003/0179742 A1 | 9/2003 | Ogier et al. | 370/351 |
| 2004/0128345 A1 | 7/2004 | Robinson et al. | 709/203 |

OTHER PUBLICATIONS

Office Action mailed Dec. 12, 2007, U.S. Appl. No. 10/997,318, filed Nov. 24, 2004, entitled "System and Method for Expanding the Range of a Mesh Network".

* cited by examiner

SYSTEM AND METHOD FOR DYNAMIC EGRESS ROUTING THROUGH A SINGLE DEFAULT GATEWAY IN A MESH NETWORK

CROSS-REFERENCE TO RELATED APPLICATIONS

The present invention is related to a patent application having Ser. No. 10/997,318, entitled: "System and Method for Expanding the Range of a Mesh Network", filed concurrently with this application. The present invention is also related to a patent application having Ser. No. 10/996,769, entitled: "System and Method for Using a Hop Limited Cast for Internet Egress Point Selection", filed concurrently with this application. The related applications are assigned to the assignee of the present patent application and are hereby incorporated by reference.

BACKGROUND OF THE INVENTION

Wireless communication between devices is becoming a more prevalent and accepted method of providing network communication. Wireless communication may take place on a mesh network comprised of mesh boxes or mesh-configured computing devices referred to as mesh nodes. A mesh network is a network topology in which mesh nodes are connected by self-forming connections as mesh nodes enter the network. In a large-scale well-connected mesh network, users expect to access any part of the mesh network from any other part of the mesh. Stated another way, users want to access the same resources from their desktop at home, from their laptop, from a coffee shop, from a kiosk at the library, or from a tablet at school. Assuming all the locations are connected to the same mesh network, this expectation of connectivity is reasonable.

Wireless communication, however, may have several limitations that effect communication on a mesh network. These limitations may arise from the routing protocol of the mesh network. In order to communicate information between two distant mesh nodes, mesh nodes route through intermediate mesh nodes. A data packet routed through a mesh node is generally referred to as a hop. For example, if a data packet must traverse three mesh nodes before reaching a destination mesh node, the data packet will make two hops. Also, a data packet may have several paths through the mesh available for routing. Each of the several paths may have different connectivity. For example, one path may require a data packet to make eight hops while another path may only require two hops. In general, as hops on the mesh increase, latency increases; hence, the communication path between two mesh nodes cannot practically scale beyond a limited number of hops before connectivity falls below user expectations. Accordingly, there exists a need to identify the path through a mesh network with the fewest number of hops in order to minimize latency for devices communicating on a mesh network.

SUMMARY OF THE INVENTION

Aspects of the present invention relate to a system and method for dynamic egress routing through a single default gateway in a mesh network. One aspect of the present invention includes a computer-implemented method for managing routing to Internet egress points on a network. By using a list of Internet egress points, a default gateway manages routes for a client. A metric is then applied to the list of Internet access points to determine the most optimal path. The optimal path is used to manage Internet access routing for the client.

Another aspect includes a computer-readable medium that has computer-executable instructions for managing routing to Internet egress points on a network. The instructions include obtaining a list of paths from a default gateway to an Internet egress point. The instructions also include determining an optimal path and using the optimal path to manage Internet access routing for a client.

Yet another aspect includes a system for managing routing to Internet egress points on a network. The system includes a default gateway configured to route data packets between the Internet egress points and a client The default gateway determines the optimal path to the Internet egress points. These and other embodiments will be evident as more fully set forth in the detailed description and claims below.

DETAILED DESCRIPTION

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
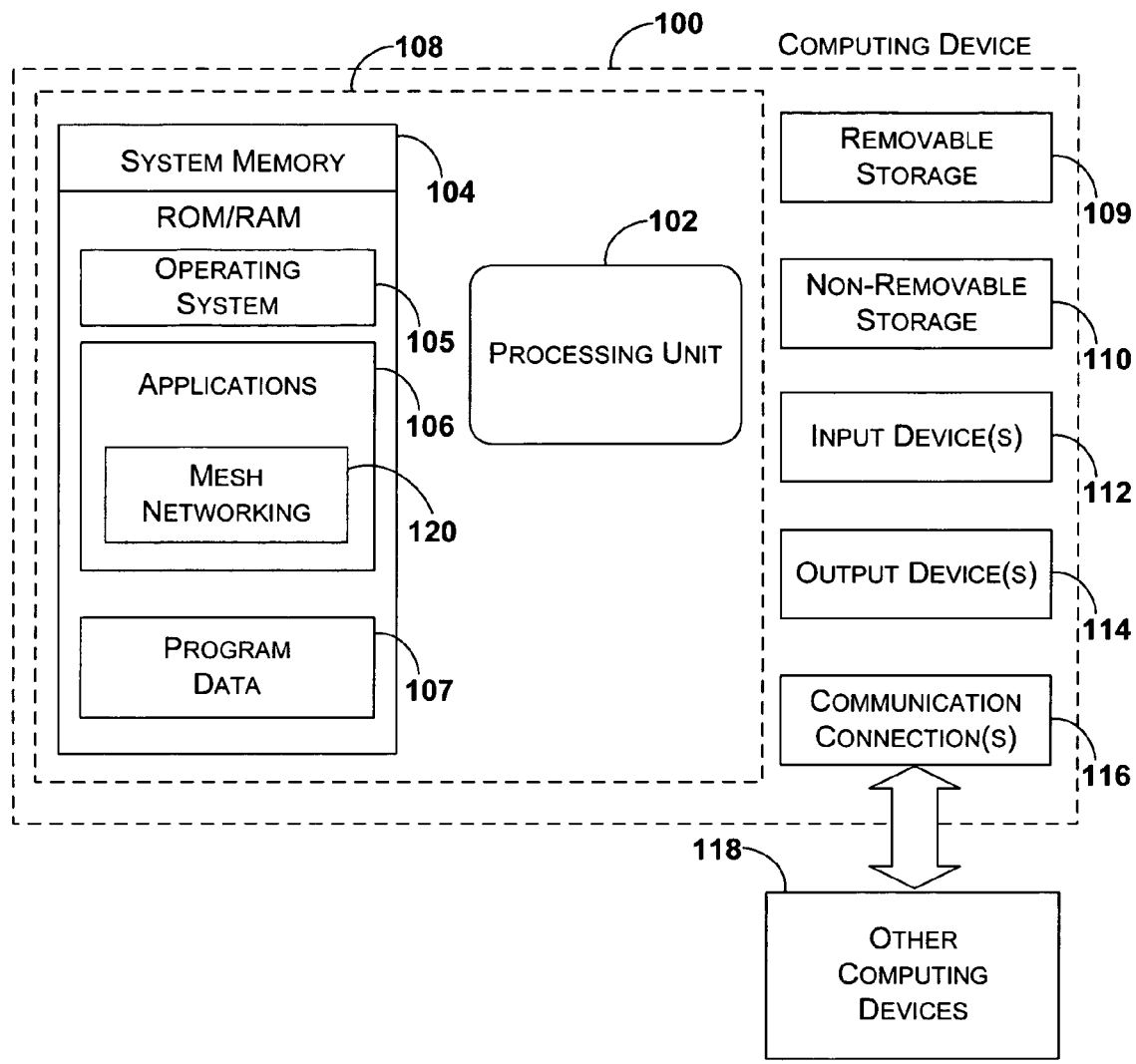
FIG. 1 illustrates an exemplary computing device that may be used in one exemplary embodiment of the present invention.

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more applications 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network or a wireless mesh network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In one embodiment, applications 106 further include an application 120 for implementing mesh networking functionality in accordance with the present invention. The functionality represented by application 120 may be further supported by additional input devices, 112, output devices 114, and communication connection(s) 116 that are included in computing device 100 for establishing and maintaining a mesh network.

Figure 2:
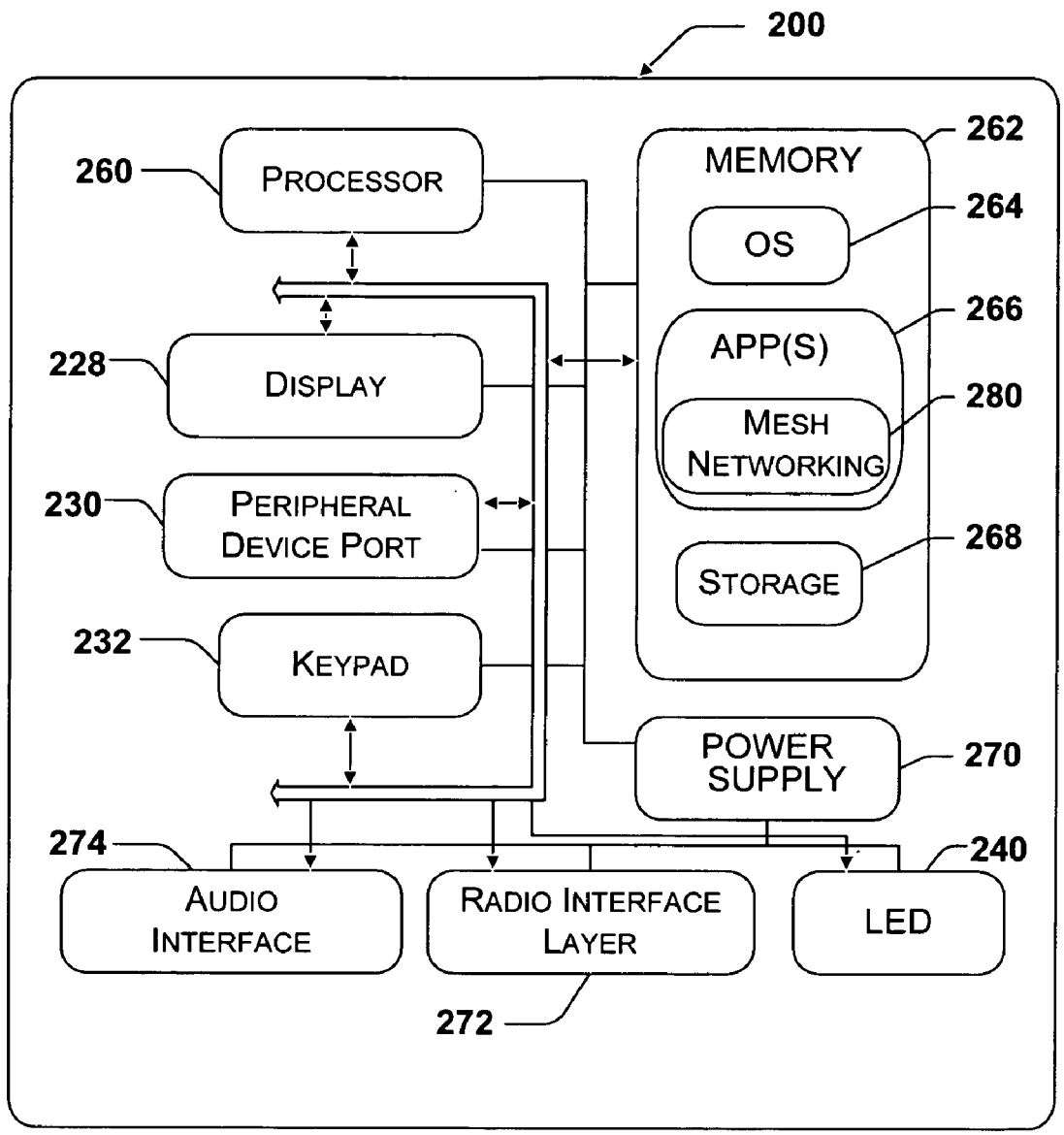
FIG. 2 illustrates an exemplary mobile device that may be used in one exemplary embodiment of the present invention.

FIG. 2 illustrates a mobile computing device that may be used in one exemplary embodiment of the present invention. With reference to FIG. 2, one exemplary system for implementing the invention includes a mobile computing device, such as mobile computing device 200. The mobile computing device 200 has a processor 260, a memory 262, a display 228, and a keypad 232. The memory 262 generally includes both volatile memory (e.g., RAM) and non-volatile memory (e.g., ROM, Flash Memory, or the like). The mobile computing device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile computing devices. The display 228 may be touch-sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing application, and the like.

The mobile computing device 200 has a power supply 270, which may be implemented as one or more batteries. The power supply 270 might further include an external power source, such as an AC adapter or a powered docking cradle that supplements or recharges the batteries.

The mobile computing device 200 is shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a radio interface layer 272 that performs the function of transmitting and receiving communications, such as radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

In one embodiment, applications 266 further include an application 280 for implementing mesh networking functionality in accordance with the present invention. The functionality represented by application 280 may be further supported by structure in radio interface layer 272 that is included in mobile device 200 for establishing and maintaining a mesh network.

Figure 3:
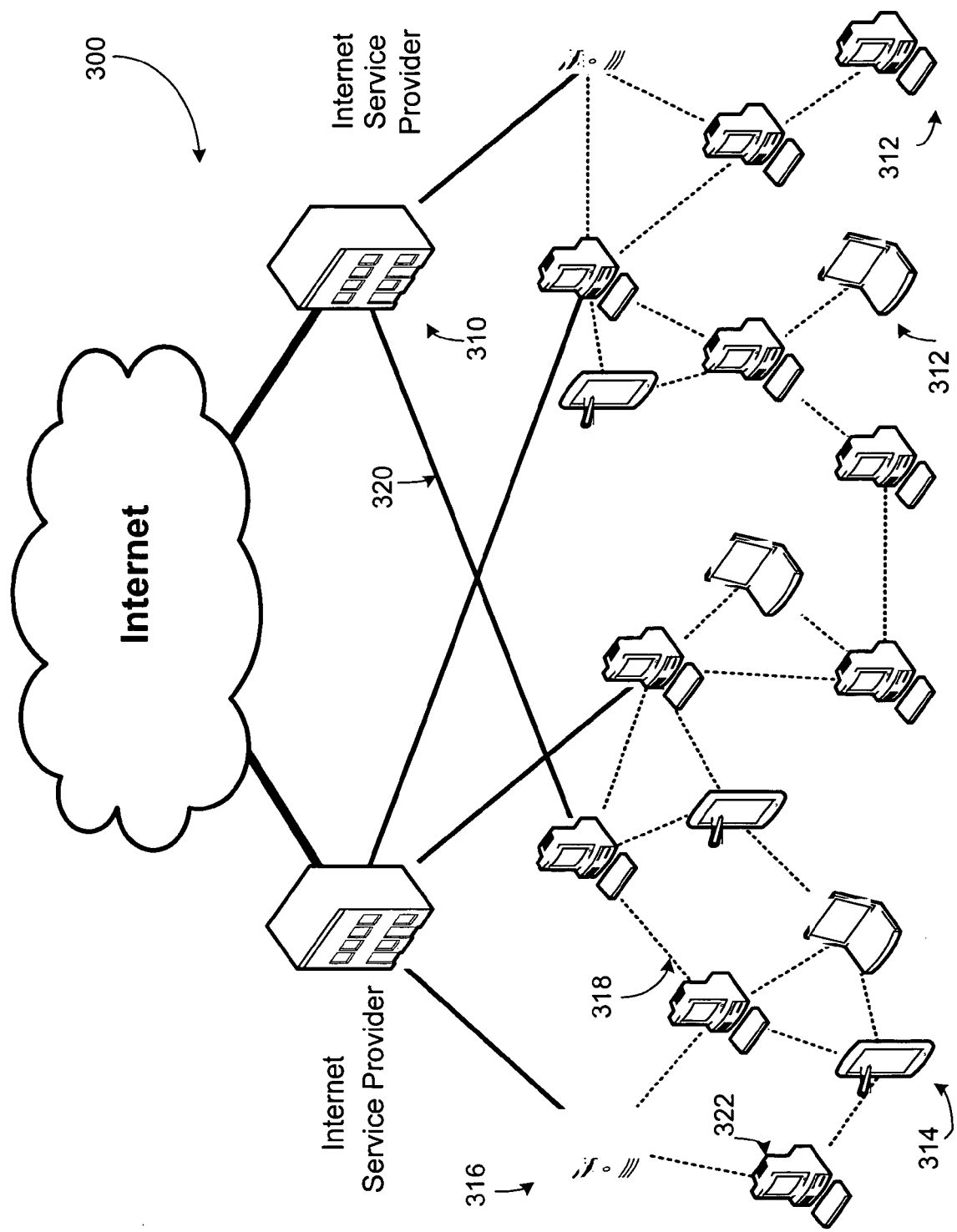
FIG. 3 illustrates an exemplary mesh network that may be used in one exemplary embodiment of the present invention.

FIG. 3 illustrates a mesh network 300 that may be used in one exemplary embodiment of the present invention. Mesh network 300 may comprise any topology of mesh nodes, Internet service providers and communication media. Also, the mesh network 300 may have a static or dynamic topology without departing from the spirit and scope of the present invention.

The mesh network 300 includes one or more Internet service providers 310, which provide Internet access points for one or more mesh nodes. Each mesh node may comprise any device that is connected to the mesh network 300. The mesh node may transmit and receive data packets and also may pass data packets to other mesh nodes in accordance with the routing protocol of the mesh network 300. The mesh node may be a fixed device or a mobile device. For example, the mesh node may include a computing device 312 that is similar to computing device 100 described above in conjunction with FIG. 1. The mesh node may also include a mobile computing device 314 that may be similar to mobile computing device 200 described above in conjunction with FIG. 2. Other embodiments may include other configurations of mesh nodes. For example, a mesh node may include a dedicated computer that only routes data packets from one mesh node to another such as the mesh box 316.

In one exemplary embodiment of the present invention, the mesh network 300 has a network topology in which mesh nodes are connected with several redundant connections between the mesh nodes. The mesh network 300 may include a full mesh where every mesh node is connected to every other mesh node in the mesh network. Mesh network 300 may also include a partial mesh topology where some mesh nodes are organized in a full mesh and other mesh nodes are only connected to one or two other mesh nodes. Other mesh topologies may include one or more subnets connected to the mesh network. These subnets may have a plurality of clients connected thereto. The various topologies for the mesh network 300 are endless and will not be further set forth herein.

Reference number 318 indicates communication media between the mesh nodes. By way of example, and not limitation, communication media 318 may include wired media such as a wired network or direct-wired connection, and wireless media such as acoustic, RF, infrared and other wireless media. Reference number 320 indicates communication media between Internet service provider 310 and one or more of the mesh nodes. The communication media 320 may include wired media such as a wired network or direct-wired connection, and wireless media such as acoustic, RF, infrared and other wireless media.

In the mesh network 300, mesh nodes may transmit and receive data packets from other mesh nodes and/or from the Internet. Routing tables typically determine what path a data packet traverses through the mesh network. The routing of a data packet is commonly determined at a source node. Stated another way, the node sending a data packet may determine the route a data packet takes through the mesh network. A data packet routed from a mesh node to reach another mesh node is typically referred to as a "hop." For example, if mesh node 314 desires to transmit a data packet to mesh node 316, the routing tables accessible to mesh node 314 may indicate routing will take place through mesh node 322. Accordingly, the data packet will make two hops (node 314 to node 322 and node 322 to node 316). In general, latency increases proportionally with the number of hops a data packet must make to reach a mesh node. Also, routing tables may indicate several available paths for a data packet to traverse to reach a destination. Routing tables may also indicate that a destination mesh node is inaccessible because the number of hops is too great. Therefore, it is advantageous for each node to have access to routing tables with the most optimal path between nodes. It is also advantageous for each node to have access to routing tables that provide greater access to the mesh network.

Figure 4:
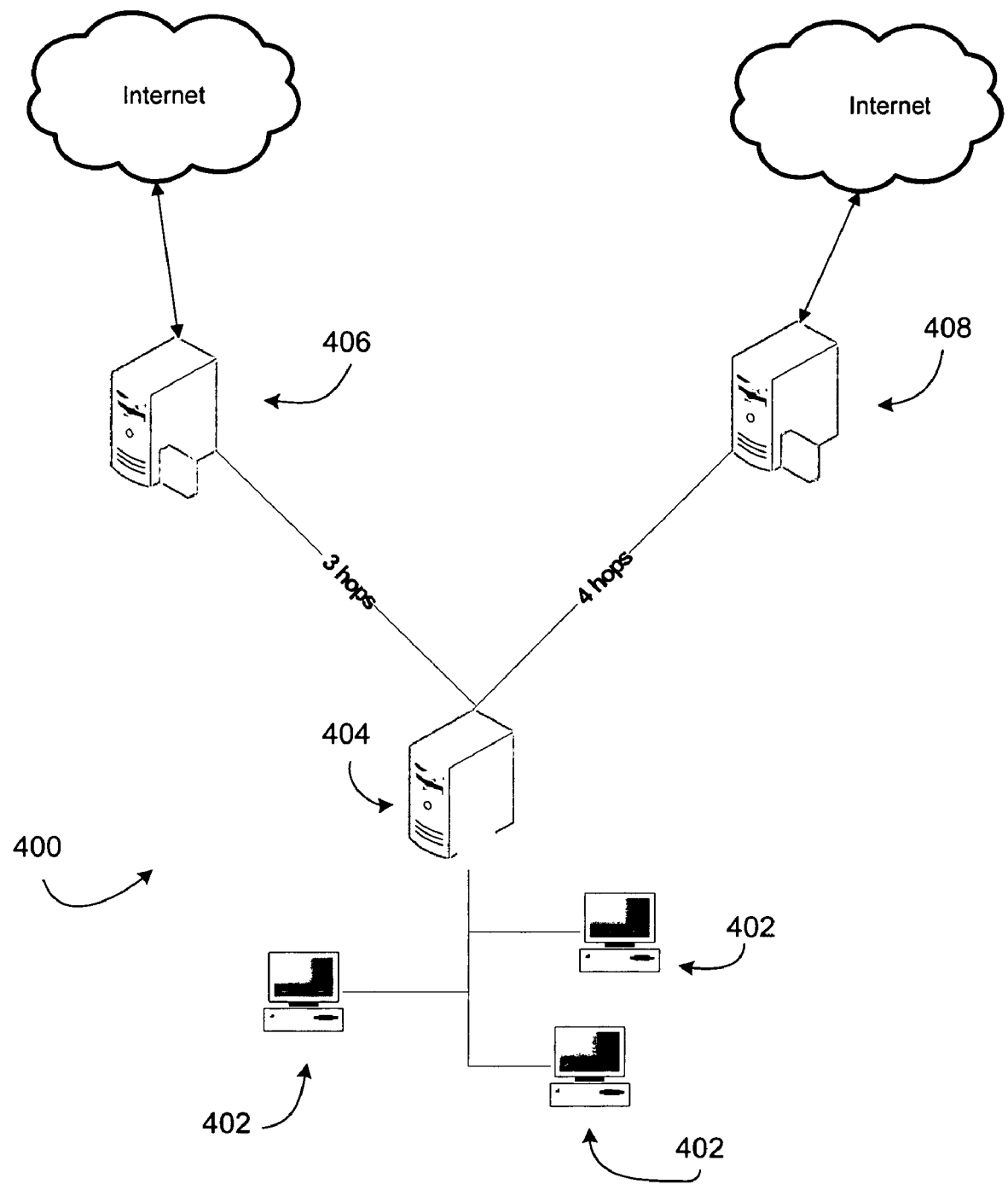
FIG. 4 illustrates an exemplary mesh network that may be used in one exemplary embodiment of the present invention

Illustrative Embodiments of Dynamic Egress Routing Through A Single Default Gateway FIG. 4 illustrates an exemplary mesh topology for one embodiment of the present invention. As stated above, the mesh network may have various topologies without departing from the spirit and scope of the present invention. The mesh topology in FIG. 4 is for exemplary and explanatory purposes only and not for purposes of limiting the scope of the present invention as will be fully set forth in the claims below.

Mesh network 400 includes mesh nodes 404, 406 and 408. Mesh node 404 is referred to herein as default gateway 404 in that it provides clients 402 a default gateway to the mesh network 400. Mesh nodes 406 and 408 are referred to herein as egress mesh nodes 406 and 408 in that they provide Internet egress points in the mesh network 400.

Clients 402 may include any type of computing device or mobile computing device capable of communication with a network. The clients 402 may be configured as a subnet wherein the subnet connects to a default gateway 404. The subnet may include any type of topology set forth above in conjunction with FIG. 3. When clients 402 attempt to communicate with the Internet, the clients 402 use default gateway 404 to route data packets to the Internet. Default gateway 404 determines how to route communications between the clients 402 and the Internet as will be more fully set forth below.

The clients 402 will request the address of the default gateway 404 and the default gateway 404 will provide each client 402 with its address. The request may include a DHCP request (dynamic host configuration protocol) and the address may include an Internet Protocol ("IP") address and/or a default gateway address. Other processes are contemplated as long as data packets are capable of being routed between the clients 402 and the default gateway 404. When clients 402 attempt to communicate with the Internet, the default gateway 404 will decide which egress mesh node 406 or 408 to route through in order to reach the Internet. For example, in FIG. 4, egress mesh node 406 is three hops from default gateway 404 and egress mesh node 408 is four hops from default gateway 404. If the decision of default gateway 404 was based solely on hop count, routing would occur through egress mesh node 406. However, hop count may be only one of many parameters to determine an optimal route to the Internet as is more fully described below in conjunction with FIG. 5.

Figure 5:
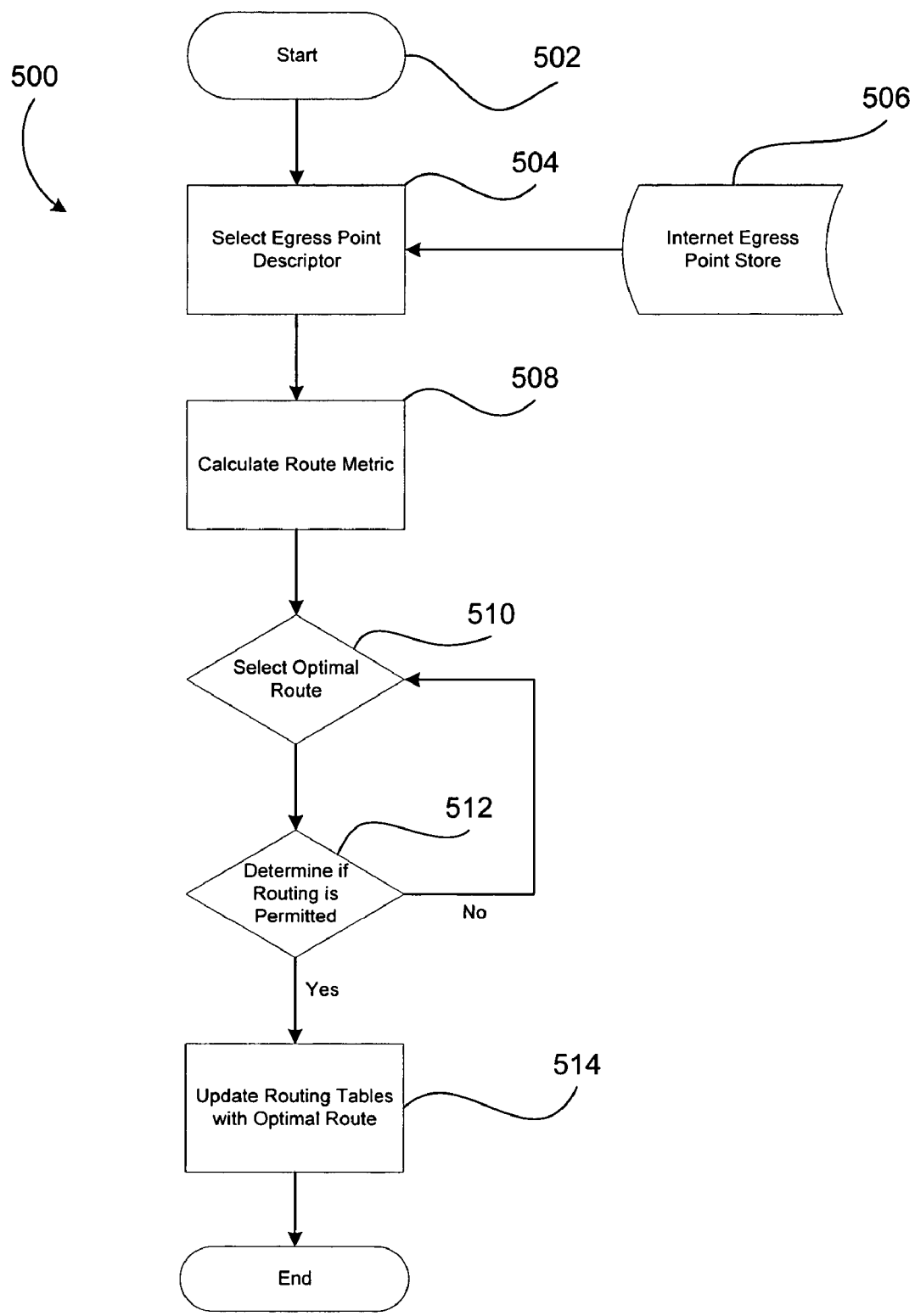
FIG. 5 illustrates a logical flow diagram of one aspect of the present invention.

FIG. 5 represents a logical flow diagram of one embodiment of the present invention. As an illustration, the process 500 may occur at default gateway 404; however, it is contemplated that any mesh node on a mesh network may perform the process 500. The process 500 starts at starting block 502 and flows to block 504 where an egress point descriptor is selected from an Internet egress point store 506. The egress point descriptor may include the address and/or route to an Internet egress point. It is contemplated that the egress point descriptor may comprise other data to describe an egress point of the mesh network. Also, the egress point descriptor store may include one or more egress point descriptors that describe one or more routes to an egress point. For example, default gateway 404 may include an egress point descriptor store having one or more stored Internet egress point descriptors such as an egress point descriptor of the egress point associated with the egress mesh node 406. Default gateway 404 may then select an egress point descriptor from the store 506. The store 506 may include any type of storage so long as at least default gateway 404 has access to the store 506.

Block 508 indicates the step of calculating the route metric for a route to an Internet egress point. Generally, the route metric may be calculated in various ways depending on the routing protocol of the mesh network. In one embodiment, the routing metric includes a rating or identifier that indicates the efficiency of a route to an Internet egress point. The routing metric may consider several factors in order to rate a path to an Internet egress point. For example, such factors may include the hop count or latency between the default gateway and the Internet egress point associated with the egress mesh node 406. Other factors may include the amount of interference, the signal strength, the transmission capacity, the casting capacity and/or the throughput between the default gateway 404 and the Internet egress point associated with egress mesh node 406.

In one embodiment, the route metric calculation takes advantage of the MCL protocol (mesh connectivity layer). Stated another way, the MCL acts as an optimal route calculation engine; the MCL does not need to actually route the data. In such a situation, default gateway 404 will select an egress point descriptor as identified by block 504. The MCL may then calculate the routing metric through Link Quality Source Routing. Other protocols are contemplated as long as the routes to the Internet egress points can be rated. Once the egress routing metric has been calculated, the default gateway 404 is given access to the egress routing metric. The route identified by the metric may be stored in a hierarchy of routes or any other type of store known in the art. The process 500 continues to block 510.

Block 510 indicates the step of selecting the optimal route through the mesh network. The optimal route may be indicated by the route metric. Again, this selection may occur by selecting the optimal route from a hierarchy of routes. This selection may also include selecting the optimal route from a plurality of unsorted routes. The process 500 continues to block 512.

Block 512 identifies the step of determining if routing is permitted to the Internet egress point having the optimal route. A default gateway may send a request to the optimal egress point for permission to use the optimal egress point. In the situation where the optimal egress point is already serving several clients, the optimal egress point may deny permission to route through the egress point. For example, default gateway 404 may send a request to egress mesh node 406 asking permission to use the Internet service provider associate with egress mesh node 406. Egress mesh node 406 may be serving fifteen clients at the time of the request. Accordingly, egress mesh node 406 may deny default gateway 404 access to the Internet egress point. In such a situation the process 500 selects a second egress route and continues by looping back to step 510. In one embodiment of the present invention, the second egress route is the second most optimal route to the Internet egress point. This process continues until routing to an Internet egress point is permitted. Once routing is permitted, the process 500 continues to block 514 where the routing tables are updated with the most optimal route. The default gateway may then use the routing tables to optimally route information between the Internet and the clients.

The process 500 may be static or dynamic without departing from the spirit and scope of the present invention. Stated another way, the process 500 may only run during predetermined intervals, such as when a client attempts to communicate with the Internet or a node on the mesh network. The process 500 might also be dynamic, meaning that the routes could be continuously updated as the characteristics of the mesh network change.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for dynamic egress routing through a default gateway in a mesh network, the method comprising:

providing a default gateway, a client device, a first egress mesh node and a second egress mesh node, wherein the first egress mesh node and the second egress mesh node are in direct communication with the internet, wherein communication between the default gateway and the first egress mesh node passes through a plurality of internal mesh nodes which indicate a first hop count, wherein communication between the default gateway and the second egress mesh node passes through a plurality of internal mesh nodes which indicate a second hop count, wherein communication from the client to the internet first passes through the gateway before passing through at least one member of a group comprising: the plurality of internal mesh nodes having the first hop count and the plurality of internal mesh nodes having the second hop count;

obtaining, at the default gateway, route identifiers of the first and second egress mesh nodes in communication with the default gateway, wherein the route identifier for the first egress mesh node includes the first hop count, wherein the route identifier for the second egress mesh node includes the second hop count;

periodically calculating, at the default gateway, a route matrix for each of the route identifiers, wherein the route matrix is based on the first hop count, the second hop count, and link quality source routing calculated by a mesh connectivity layer;

storing, on the default gateway, a hierarchy of routes, wherein the hierarchy of routes is based on the calculated route matrix for each of the route identifiers, wherein the hierarchy is dynamic based on the periodic calculation of the route matrix;

identifying, on the default gateway, an optimal route to the first egress mesh node based on hop count and the link quality source routing calculated by the mesh connectivity layer;

sending a permission request from the default gateway to the first egress mesh node identified by the optimal route;

updating a routing table of the default gateway with the internet protocol address of the first egress mesh node identified by the optimal route when the default gateway receives permission from the first egress mesh node identified by the optimal route;

updating a routing table of the default gateway with the internet protocol address of the second egress mesh node when the default gateway does not receive permission from the first egress mesh node identified by the optimal route;

receiving, at the default gateway, a data packet from the at least one client for routing to at least one member of a group comprising: the internet protocol address of the first egress mesh node and the internet protocol address of the second egress mesh node; and routing the data packet from the default gateway to the internet according to the updated routing table, wherein the routing includes at least one member of a group comprising: sending the data packet from the default gateway through the plurality of internal mesh nodes which indicate the first hope count to reach the first egress mesh node at the internet protocol address of the of the first egress mesh node and sending the data packet from the default gateway through the plurality of internal mesh nodes which indicate the second hope count to reach the second egress mesh node at the internet protocol address of the of the second egress mesh node.

2. The computer-implemented method of claim 1, wherein the hierarchy of routes includes a list of addresses of the first and second egress mesh nodes.

3. The computer-implemented method of claim 1, wherein the hierarchy of routes includes paths through a mesh network located between the default gateway and the egress mesh node.

4. The computer-implemented method of claim 1, wherein the route matrix includes consideration of at least one factor from a group of factors comprising: latency between the default gateway and the egress mesh node, interference between the default gateway and the egress mesh node, signal strength between the default gateway and the egress mesh node, transmission capacity between the default gateway and the egress mesh node, casting capacity between the default gateway and the egress mesh node, and throughput between the default gateway and the egress mesh node.

5. The computer-implemented method of claim 1, further comprising:
receiving a request at the default gateway from the at least one client, wherein the request is a request for an address of the default gateway; and
sending, from the default gateway to the client, the address of the default gateway to cause the client to send that data packets to the default gateway before the packets are routed to the internet according to the routing table.

6. The computer-implemented method of claim 1, wherein the at least one client is associated with a mesh of clients, wherein each client of the mesh of clients is configured with an address of the default gateway to cause each client of the mesh of clients to send data packets to the default gateway for routing to the internet according to the routing table of the default gateway.

7. A computer-readable storage medium having computer executable instructions for dynamic egress routing through a default gateway in a mesh network, the instructions comprising:
providing a default gateway, a client device, a first egress mesh node and a second egress mesh node, wherein the first egress mesh node and the second egress mesh node are in direct communication with the internet, wherein communication between the default gateway and the first egress mesh node passes through a plurality of internal mesh nodes which indicate a first hop count, wherein communication between the default gateway and the second egress mesh node passes through a plurality of internal mesh nodes which indicate a second hop count, wherein communication from the client to the internet first passes through the gateway before passing through at least one member of a group comprising: the plurality of internal mesh nodes having the first hop count and the plurality of internal mesh nodes having the second hop count;
obtaining, at the default gateway, route identifiers of the first and second egress mesh nodes in communication with the default gateway, wherein the route identifier for the first egress mesh node includes the first hop count, wherein the route identifier for the second egress mesh node includes the second hop count;
periodically calculating, at the default gateway, a route matrix for each of the route identifiers, wherein the route matrix is based on the first hop count, the second hop count and link quality source routing calculated by a mesh connectivity layer;
storing, on the default gateway, a sorted hierarchy of routes, wherein the sorted hierarchy of routes is based on the calculated route matrix for each of the route identifiers, wherein the sorted hierarchy of routes is dynamic based on the periodic calculation of the route matrix;
identifying, on the default gateway, an optimal route to the first egress mesh node based on hop count and the link quality source routing calculated by the mesh connectivity layer;
sending a permission request from the default gateway to the first egress mesh node identified by the optimal route;
updating a routing table of the default gateway with the internet protocol address of the first egress mesh node identified by the optimal route when the default gateway receives permission from the first egress mesh node identified by the optimal route;
updating a routing table of the default gateway with the internet protocol address of the second egress mesh node when the default gateway does not receive permission from the first egress mesh node identified by the optimal route;
receiving, at the default gateway, a data packet from the at least one client for routing to at least one member of a group comprising: the internet protocol address of the first egress mesh node and the internet protocol address of the second egress mesh node; and
routing the data packet from the default gateway to the internet according to the updated routing table, wherein the routing includes at least one member of a group comprising: sending the data packet from the default gateway through the plurality of internal mesh nodes which indicate the first hope count to reach the first egress mesh node at the internet protocol address of the of the first egress mesh node and sending the data packet from the default gateway through the plurality of internal mesh nodes which indicate the second hope count to reach the second egress mesh node at the internet protocol address of the of the second egress mesh node.

8. The computer-readable storage medium of claim 7, wherein the sorted hierarchy of routes includes a list of addresses of the first and second egress mesh nodes.

9. The computer-readable storage medium of claim 7, wherein the sorted hierarchy of routes includes paths through a mesh network located between the default gateway and the egress mesh node.

10. The computer-readable storage medium of claim 7, wherein the route matrix includes consideration of at least one factor from a group of factors comprising: latency between the default gateway and the egress mesh node, interference between the default gateway and the egress mesh node, signal strength between the default gateway and the egress mesh node, transmission capacity between the default gateway and the egress mesh node, casting capacity between the default gateway and the egress mesh node, and throughput between the default gateway and the egress mesh node.

11. The computer-readable storage medium of claim 7, further comprising:
receiving a request at the default gateway from the at least one client, wherein the request is a request for an address of the default gateway; and
sending, from the default gateway to the client, the address of the default gateway to cause the client to send that data packets to the default gateway before the packets are routed to the internet according to the routing table.

12. The computer-readable storage medium of claim 7, wherein the at least one client is associated with a mesh of clients, wherein each client of the mesh of clients is configured with an address of the default gateway to cause each client of the mesh of clients to send data packets to the default gateway for routing to the internet according to the routing table of the default gateway.

13. A system for dynamic egress routing through a default gateway in a mesh network, the system comprising:
   a processor; and
   a memory having computer-executable instructions stored thereon, wherein the computer-executable instructions are configured for:
      providing a default gateway, a client device, a first egress mesh node and a second egress mesh node, wherein the first egress mesh node and the second egress mesh node are in direct communication with the internet, wherein communication between the default gateway and the first egress mesh node passes through a plurality of internal mesh nodes which indicate a first hop count, wherein communication between the default gateway and the second egress mesh node passes through a plurality of internal mesh nodes which indicate a second hop count, wherein communication from the client to the internet first passes through the gateway before passing through at least one member of a group comprising: the plurality of internal mesh nodes having the first hop count and the plurality of internal mesh nodes having the second hop count;
      obtaining, at the default gateway, route identifiers of the first and second egress mesh nodes in communication with the default gateway, wherein the route identifier for the first egress mesh node includes the first hop count, wherein the route identifier for the second egress mesh node includes the second hop count;
      periodically calculating, at the default gateway, a route matrix for each of the route identifiers, wherein the route matrix is based on the first hop count, the second hop count and link quality source routing calculated by a mesh connectivity layer;
      storing, on the default gateway, a sorted hierarchy of routes, wherein the sorted hierarchy of routes is based on the calculated route matrix for each of the route identifiers, wherein the sorted hierarchy of routes is dynamic based on the periodic calculation of the route matrix;
      identifying, on the default gateway, an optimal route to the first egress mesh node based on hop count and the link quality source routing calculated by the mesh connectivity layer;
      sending a permission request from the default gateway to the first egress mesh node identified by the optimal route;
      updating a routing table of the default gateway with the internet protocol address of the first egress mesh node identified by the optimal route when the default gateway receives permission from the first egress mesh node identified by the optimal route;
      updating a routing table of the default gateway with the internet protocol address of the second egress mesh node when the default gateway does not receive permission from the first egress mesh node identified by the optimal route;
      receiving, at the default gateway, a data packet from the at least one client for routing to at least one member of a group comprising: the internet protocol address of the first egress mesh node and the internet protocol address of the second egress mesh node; and
      routing the data packet from the default gateway to the internet according to the updated routing table, wherein the routing includes at least one member of a group comprising: sending the data packet from the default gateway through the plurality of internal mesh nodes which indicate the first hope count to reach the first egress mesh node at the internet protocol address of the of the first egress mesh node and sending the data packet from the default gateway through the plurality of internal mesh nodes which indicate the second hope count to reach the second egress mesh node at the internet protocol address of the of the second egress mesh node.

14. The system of claim 13, wherein the sorted hierarchy of routes includes a list of addresses of the first and second egress mesh nodes.

15. The system of claim 13, wherein the sorted hierarchy of routes includes paths through a mesh network located between the default gateway and the egress mesh node.

16. The system of claim 13, wherein periodically calculating the route matrix includes utilizing mesh conductivity layer protocol as a calculation engine.

17. The system of claim 13, further comprising:
   receiving a request at the default gateway from the at least one client, wherein the request is a request for an address of the default gateway; and
   sending, from the default gateway to the client, the address of the default gateway to cause the client to send that data packets to the default gateway before the packets are routed to the internet according to the routing table.

18. The system of claim 13, wherein the at least one client is associated with a mesh of clients, wherein each client of the mesh of clients is configured with an address of the default gateway to cause each client of the mesh of clients to send data packets to the default gateway for routing to the internet according to the routing table of the default gateway.

* * * * *